US010992156B2

(12) United States Patent
Ermon et al.

(10) Patent No.: US 10,992,156 B2
(45) Date of Patent: Apr. 27, 2021

(54) AUTONOMOUS SCREENING AND OPTIMIZATION OF BATTERY FORMATION AND CYCLING PROCEDURES

(71) Applicant: The Board of Trustees of the Leland Stanford Junior University, Stanford, CA (US)

(72) Inventors: Stefano Ermon, Menlo Park, CA (US); William C. Chueh, Menlo Park, CA (US); Aditya Grover, Stanford, CA (US); Todor Mihaylov Markov, San Francisco, CA (US); Nicholas Perkins, San Francisco, CA (US); Peter M. Attia, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 16/161,790

(22) Filed: Oct. 16, 2018

(65) Prior Publication Data

US 2019/0115778 A1 Apr. 18, 2019

Related U.S. Application Data

(60) Provisional application No. 62/573,561, filed on Oct. 17, 2017.

(51) Int. Cl.
*H02J 7/00* (2006.01)
*G05B 13/04* (2006.01)

(52) U.S. Cl.
CPC ........ *H02J 7/00718* (2020.01); *G05B 13/042* (2013.01); *G05B 13/048* (2013.01);
(Continued)

(58) Field of Classification Search
CPC .. H02J 7/007; H02J 7/0047; H02J 7/00; H02J 7/0021; H02J 7/00718; H02J 7/00036;
(Continued)

(56) References Cited

U.S. PATENT DOCUMENTS 7,528,574 B1 5/2009 Adkins et al.
8,531,158 B2 * 9/2013 Wang ................ H01M 10/0525
320/132
(Continued)

OTHER PUBLICATIONS

Ozcan et al. ("Online state of charge estimation for Lithium-ion batteries using Gaussian process regression"; IECON 2016—42nd; Annual Conference of the IEEE Industrial Electronics Society; Conference (Year: 2016).*
(Continued)

*Primary Examiner* — Helen Rossoshek
(74) *Attorney, Agent, or Firm* — Lumen Patent Firm

(57) ABSTRACT

A method of probing a multidimensional parameter space of battery cell test protocols is provided that includes defining a parameter space for a plurality of battery cells under test, discretizing the parameter space, collecting a preliminary set of cells being cycled to failure for sampling policies from across the parameter space and include multiple repetitions of the policy, specifying resource hyperparameters, parameter space hyperparameters, and algorithm hyperparameters, selecting a random subset of charging policies, testing the random subset of charging policies until a number of cycles required for early prediction of battery lifetime is achieved, inputting cycle data for early prediction into an early prediction algorithm to obtain early predictions, inputting the early predictions into an optimal experimental design (OED) algorithm to obtain recommendations for running at least one next test, running the recommended tests by repeating from the random subset testing step above, and validating final recommended policies.

13 Claims, 2 Drawing Sheets

(52) U.S. Cl.
CPC ............ *H02J 7/007* (2013.01); *H02J 7/0091* (2013.01); *H02J 7/007184* (2020.01); *H02J 7/007192* (2020.01); *H02J 2203/20* (2020.01)

(58) Field of Classification Search
CPC .. H02J 7/007184; H02J 2203/20; H02J 7/042; H02J 7/1423; H02J 7/0091; H01M 2010/4271; H01M 10/4257; H01M 10/425; H01M 10/482; H01M 2010/4278; H01M 10/488; G05B 13/048; G05B 13/042; G06F 2119/04; G06F 30/20
See application file for complete search history.

(56) References Cited

U.S. PATENT DOCUMENTS

| | | | | |
|---|---|---|---|---|
| 9,018,916 | B2* | 4/2015 | Iriyama | H01M 4/485 |
| | | | | 320/136 |
| 9,442,165 | B2* | 9/2016 | Asghari | H02J 3/381 |
| 9,465,078 | B2* | 10/2016 | Betzner | H01M 10/486 |
| 9,939,862 | B2* | 4/2018 | Badam | G06F 1/3234 |
| 10,191,116 | B2* | 1/2019 | Aliyev | G06K 9/00536 |
| 10,556,510 | B2* | 2/2020 | Yazami | B60L 58/26 |
| 2002/0169620 | A1* | 11/2002 | Spotnitz | G06Q 30/02 |
| | | | | 705/1.1 |
| 2003/0184307 | A1* | 10/2003 | Kozlowski | B60L 3/0046 |
| | | | | 324/427 |
| 2015/0349385 | A1* | 12/2015 | Hu | H01M 10/48 |
| | | | | 429/91 |
| 2016/0146895 | A1* | 5/2016 | Yazami | H02J 7/027 |
| | | | | 324/426 |
| 2016/0187432 | A1* | 6/2016 | Saint-Marcoux | B60L 58/12 |
| | | | | 702/63 |
| 2016/0209473 | A1* | 7/2016 | You | G01R 31/367 |
| 2016/0243701 | A1* | 8/2016 | Gildert | G05B 19/42 |
| 2016/0349330 | A1* | 12/2016 | Barfield, Jr. | G07C 5/0816 |
| 2017/0213126 | A1* | 7/2017 | Hammond | G06F 3/0482 |
| 2017/0285111 | A1* | 10/2017 | Fife | H02J 13/0079 |
| 2017/0305014 | A1* | 10/2017 | Gildert | B25J 9/161 |
| 2018/0042083 | A1* | 2/2018 | Couch | H05B 45/24 |
| 2018/0095140 | A1* | 4/2018 | Park | G01R 31/378 |
| 2018/0292465 | A1* | 10/2018 | Osara | G01M 5/0033 |
| 2018/0357543 | A1* | 12/2018 | Brown | G06K 9/6256 |
| 2019/0113577 | A1* | 4/2019 | Severson | G01R 31/392 |
| 2019/0209022 | A1* | 7/2019 | Sobol | A61B 5/0002 |
| 2019/0348657 | A1* | 11/2019 | Frischmann | H01M 2/162 |
| 2020/0164763 | A1* | 5/2020 | Holme | B60L 58/10 |
| 2020/0298005 | A1* | 9/2020 | Howard | A61B 5/0022 |

OTHER PUBLICATIONS

Hoffman "On correlation and budget constraints in model-based bandit optimization with application to automatic machine learning" Appearing in Proceedings of the 17th International Conference on Artificial Intelligence and Statistics (AISTATS) 2014, Reykjavik, Iceland. JMLR: W&CP vol. 33.

* cited by examiner

AUTONOMOUS SCREENING AND OPTIMIZATION OF BATTERY FORMATION AND CYCLING PROCEDURES

CROSS-REFERENCE TO RELATED APPLICATIONS

This application claims priority from U.S. Provisional Patent Application 62/573,561 filed Oct. 17, 2017, which is incorporated herein by reference.

FIELD OF THE INVENTION

The current invention relates to battery optimization. More particularly, the invention relates to a method of screening a multidimensional parameter space of battery cell formation and cycling protocols, and optimizing within it.

BACKGROUND OF THE INVENTION

Battery optimization today is often performed by key tasks, that include unoptimized empirical testing, in which test parameters are chosen arbitrarily. Under-validated to physiochemical models have been used, which are not sufficient to optimize these processes. Implementation of limited data analysis has been tried, in which only "summary" data is used that discards important insights.

Optimization of battery protocols is a major bottleneck in lithium-ion battery development and deployment. These protocols may include fast charging, in which multistep fast charging protocols may lead to higher cycle life with lower charging times; formation cycling (typically performed immediately after cell assembly in the factory), in which complex formation protocols may reduce the formation time (thereby reducing cost) while increasing the cycle life and/or safety; and usage conditions, in which an application with flexible power draw requirements can be optimized for maximum lifetime.

The common challenges in these optimizations are both high dimensionality and high manufacturing variance. Two approaches are currently performed to probe these large parameter spaces: model optimization and grid search. Optimizing models of battery degradation is an attractive approach due to its low cost (computational, not physical); however, current battery models are of insufficient complexity and accuracy to capture all relevant degradation modes, as well as manufacturing variation. Grid search, i.e. experimentally testing these settings multiple times, is accurate but expensive in terms of time, testing equipment, and cells.

SUMMARY OF THE INVENTION

To address the needs in the art, a method of probing a multidimensional parameter space of battery cell formation and cycling protocols is provided that includes defining a parameter space for a plurality of battery cells being optimized, using a battery cycling instrument for sampling policies from across the parameter space and include one or multiple repetitions of at least one the policy, specifying hyperparameters, where the hyperparameters include resource hyperparameters, parameter space hyperparameters, and algorithm hyperparameters, selecting a subset of the charging policies, testing the subset of the charging policies until a desired accuracy is achieved, employing an optimal experimental design (OED) algorithm in a non-transitory computer-readable media to obtain recommendations for running at least one next test, running the recommended tests by repeating from the random subset testing step above, and validating final recommended policies.

According to one aspect of the invention, the parameter space includes a number of cycling steps, a cycling time, a state-of-charge (SOC) range, and a boundary on a minimum and maximum current, voltage, resistance and/or temperature per cycling step.

In another aspect of the invention, the parameter space includes a multi-step parameter space to optimize formation cycling or charging rate in a series of defined ranges of the SOC within a specified amount of time, where each the step controls a percentage of each the SOC range, where each SOC range is independent from the other SOC ranges, where a final SOC range is a summation of all the SOC ranges prior to the final SOC range.

In a further aspect of the invention, the resource hyperparameters includes a number of available testing channels, and a number of batches.

In one aspect of the invention, the parameter space hyperparameters includes a mean and standard deviation of a lifetime across all the policies, and a standard deviation of a single policy tested multiple times.

In yet another aspect of the invention, the algorithm hyperparameters include a degree of similarity between neighboring the policies in the parameter space, an exploration constant to control a balance of exploration versus exploitation, and a decay constant of the exploitation constant per round.

According to one aspect of the invention, the preliminary set of cells are configured to generate data to develop the early prediction model, quantify a mean, a standard deviation, and a range of lifetime over the parameter space, and quantify an intrinsic cell-to-cell variation for nominally identical cells cycled with nominally identical cycling conditions.

In one aspect, the invention further includes a multi-phase OED, where the multi-phase OED includes a first round and a second round of closed-loop testing, where the first round includes performing a preliminary classification of policies into a low-lifetime policy group or a high-lifetime policy group, where quantitative prediction is not required.

In another aspect, the invention further includes a dynamic early prediction, where the dynamic early prediction including the collected preliminary set of cells is relaxed in size as more data is collected if a confidence in the prediction is increased.

According to another aspect, the invention further includes multi-cell sampling per policy within a test policy round, where the multi-cell sampling is directed to one or more cells of interest within the test policy round.

DETAILED DESCRIPTION

Figure 1:
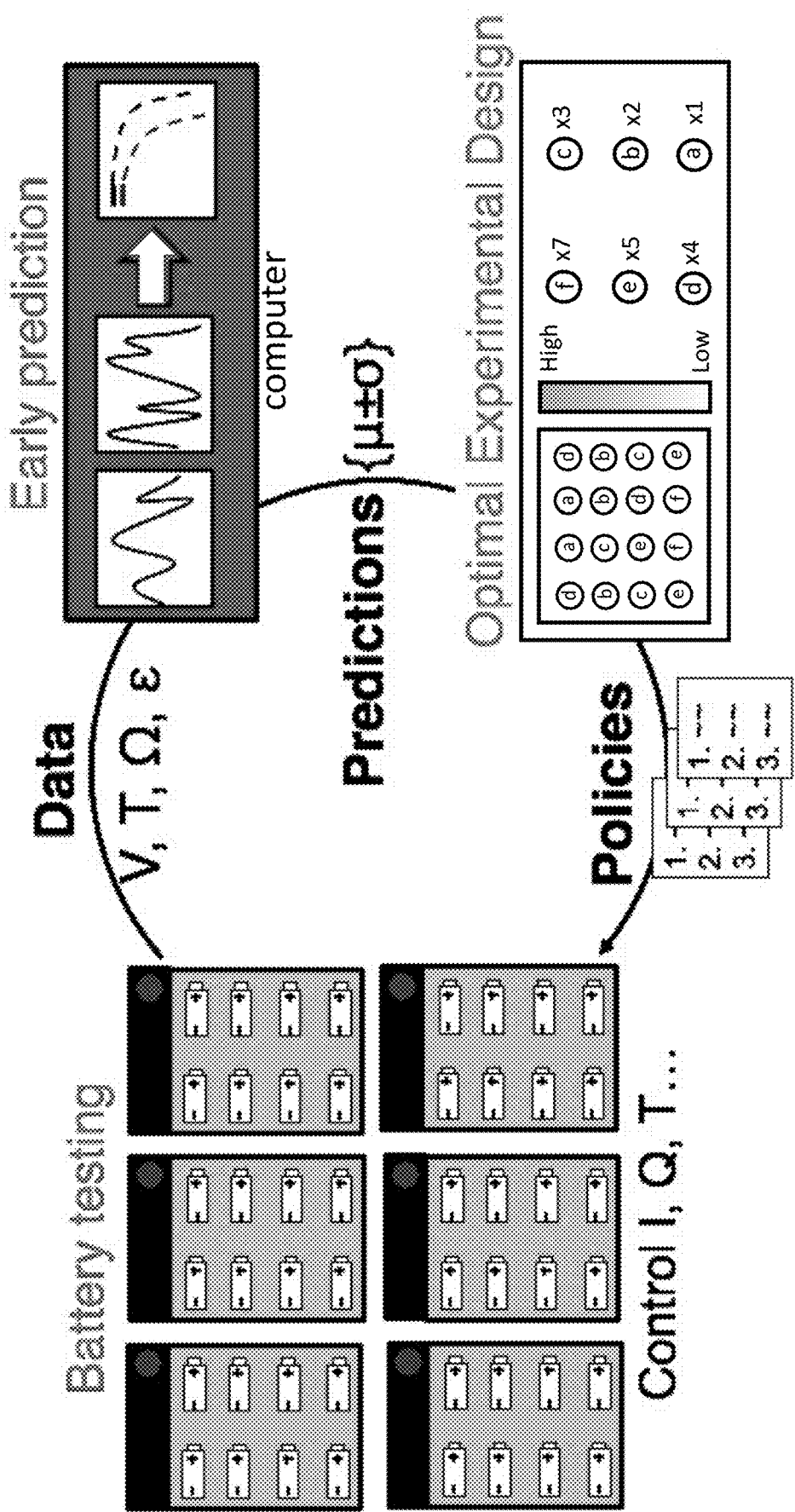
FIG. 1 shows a schematic drawing of the autonomous, closed-loop testing procedure, according to one embodiment of the invention.

Lithium-ion battery time-to-market is long because of substantial testing and optimization needed for electrochemical protocols. The current invention provides a method of shortening battery time-to-market, which ultimately reduces cost. In one aspect, the invention accelerates optimization of battery processes using adaptive optimal experimental design (OED). According to one embodiment, the invention includes closed-loop testing to battery optimization, incorporating an "adaptive" optimal experimental design algorithm to quickly find optimal battery procedures. This adaptive OED algorithm incorporates predictions of the battery lifetime using initial cycling data, as well as associated confidence intervals of the prediction, to determine whether to continue or stop the current test. If the tests stop, it will determine the next policies to test. When in use, batteries are cycled in a potentiostat, the lifetime of each cell is estimated from initial cycling results, the adaptive OED algorithm intelligently decides when to stop the current tests when the prediction has sufficient confidence, and the next policies to test are automatically sent to the potentiostat.

Applications include any battery manufacturing step or use case that requires optimization. Some examples of processes to optimize include fast charging, formation cycling, and state-of-health monitoring.

The current invention provides an optimization approach that is fully data-driven, thereby avoiding these disadvantages. In one aspect, the method for automated optimization of battery processes using adaptive optimal experimental design (adaptive OED) accelerates battery development times by up to two orders of magnitude. The method of the current invention lowers development costs and development times by orders of magnitude. Further, the invention includes intelligent use of early prediction and subsampling in optimal experimental design.

Several variations are possible, such as incorporating additional data probes, including electrochemical impedance spectroscopy (EIS) and strain monitoring, optimizing for other conditions, such as minimal volume change from swelling, and complete closed-loop testing with integrated robotics for automated cell switching.

The invention employs OED to efficiently probe a multidimensional parameter space of battery protocols. Here, efficiency is defined as low cost in terms of time and resources (testing equipment and cells). This process runs semi-autonomously, meaning that after the algorithm is designed, human input is only required for manual tasks such as loading and unloading cells. The parameter space can be either discrete or continuous.

Turning now to the algorithm, where a general method of optimizing multi-step battery protocols is provided. The algorithm maximizes an objective function over a set of input parameters given a limited budget, specifically (but not limited to) the battery context. For example, one objective includes finding the charging policy, comprising multiple current steps (the input parameters), with the maximum value of lifetime (the objective function). The objective function could include the weighted composite of multiple objectives, such as charge time and lifetime.

Hoffman et al. "On correlation and budget constraints in model-based bandit optimization with application to automatic machine learning", which is incorporated by reference in its entirety, detailed a Bayesian algorithm for fixed-budget optimization of an objective function with three unique design aspects. First, correlation among input parameters allows one to infer the behavior of similar inputs without directly testing them, which reduces the number of tests required. In other words, it can be inferred that the performance of untested charging policies from the performance of tested policies. Second, the fixed-budget setting constrains the total number of tests required, a practical limitation often faced in the real world. Third, the algorithm intelligently balances exploration and exploitation of the parameter space. Exploration refers to learning more about a previously unprobed region of the parameter space, while exploitation refers to learning more about a promising region of the parameter space.

The current invention applies the teachings of Hoffman et al. to the battery optimization context, while further incorporating new ides to enable this implementation. Specifically, the current invention incorporates two novel features to the Hoffman algorithm, which include early prediction of battery lifetime to further reduce the optimization time. Here, for a typical battery with a lifetime of 3000 cycles, an accurate early prediction algorithm is provided that uses the first 100 cycles will reduce the testing time by a factor of 30, albeit at the cost of additional sampling error (i.e. a reduced prediction confidence). Second, experiments are considered to be performed in batches. Since battery testing equipment is often designed for multiple tests in parallel, as well as for practical concerns such as cell loading/unloading process, data management, and data quality issues, battery cycling is typically performed in parallel among many testing "channels". Since multiple batches are typically required, this setting essentially runs in "parallel-sequential" mode. FIG. 1 shows a schematic drawing of this "closed-loop" process. First, a subset of batteries is tested. This data is inputted into an early prediction algorithm, which in turn produces predictions for lifetime. These predictions are then fed into an optimal experimental design algorithm, which develops recommendations as to which policies to test next. This process completes until either the budget is exhausted or the result is satisfactory.

Figure 2:
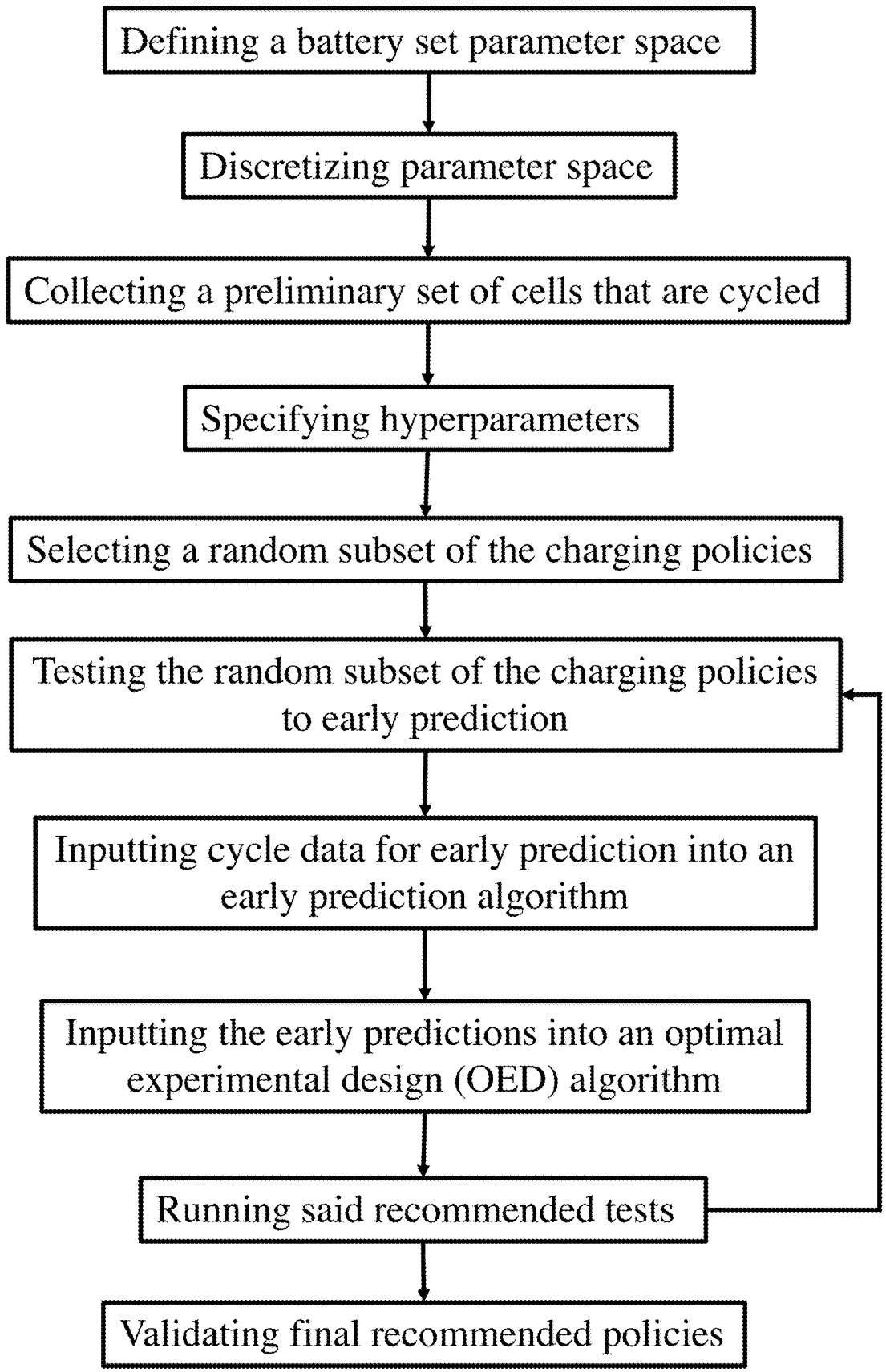
FIG. 2 shows a flow diagram of the algorithm that is implemented using implementation

Turning now to the algorithm implementation, as shown in the flow diagram of FIG. 2, where in one embodiment, it is assumed there is no prior knowledge of the parameter space, and in another embodiment, an early prediction algorithm is provided with preliminary data. Using a non-transitory computer medium, the algorithm first defines the parameter space, where the parameter space design includes the number of charging steps, charging time, state-of-charge (SOC) range, and bounds on the minimum and maximum current per step. In one exemplary embodiment, a four-step parameter space to optimize fast charging from 0% SOC to 80% SOC in 10 minutes is provided. Each step controls a 20% SOC range, i.e. C1 ranges from 0% to 20% SOC, C2 is from 20% to 40% SOC, etc. With this configuration, three parameters (C1, C2, and C3) are independent, while C4 is specified from the unique combination of C1, C2, and D.

The next step is to discretize the parameter space. In one embodiment, the parameter space is sampled with 0.4C spacing for parameter values below 6C, and sample with 1C spacing for parameter values above 1C. In total, the parameter space in this example has 224 charging policies.

A further step includes collecting a preliminary "batch" (data) of cells cycled to failure. This batch should sample policies from across the parameter space and include multiple repeats of at least one policy. This batch serves a few purposes that include generating data to develop an early prediction model, quantifying the mean, standard deviation, and range of cycle lives over the parameter space, and quantifying the intrinsic cell-to-cell variation for nominally identical cells cycled with nominally identical cycling conditions.

From here hyperparameters are then specified, where these fall into three categories that include resource hyperparameters, parameter space hyperparameters, and algorithm hyperparameters. Resource hyperparameters include (a) the number of available testing channels and (b) the number of batches (constrained by available testing time or the number of cells). Parameter space hyperparameters include the (a) mean and (b) standard deviation of lifetime across all policies, as well as (c) the standard deviation of a single policy tested multiple times. These can be estimated from the preliminary batch in step above. Algorithm hyperparameters include (a) gamma, (b) initial beta, and (c) epsilon. Gamma controls the degree of similarity between neighboring policies in the parameter space. Beta represents the exploration constant, which controls the balance of exploration vs exploitation. Epsilon represents the decay constant of beta per round; as the experiment progresses, epsilon shifts towards stronger exploitation (given by $\beta_t = \beta_0 \epsilon^t$, where $\beta_t$ represents the exploration constant at round t). These three hyperparameters can be estimated by creating a simulator based on the range of lifetimes obtained in the preliminary batch, testing all hyperparameter combinations on the simulator, and selecting the hyperparameter combination with the best performance (i.e. that which most consistently obtains the true lifetime).

The invention further includes selecting a random subset of charging policies, without replacement. The size of this subset is determined by the number of available testing to channels. This is the first round of closed-loop testing.

This selected subset is then used to test these policies until the number of cycles required for early prediction is achieved. In one implementation, the early prediction algorithm requires 100 cycles before returning a prediction.

The experimental data is then input into early prediction algorithm and obtain predictions. The details of the early prediction method are beyond the scope of this work.

Next, the predictions are input into the OED algorithm to obtain recommendations for next tests to run. The Bayesian correlation between neighboring policies and the determination of exploration vs exploitation is detailed in Hoffman.

Recommended tests are then run, where the processes from above are repeated until the number of cycles required for early prediction is achieved, where the repeated processes include testing the policies, inputting the data to the early prediction algorithm, and inputting the predictions into the OED algorithm.

The final step is to validate the recommended policies, which includes confirming that the recommendations from the OED are satisfactory by testing multiple cells with these policies to failure.

A number of variations to this OED algorithm are possible, which include multi-phase OED, dynamic early prediction, and multi-cell sampling per policy within the same round. Here the Multi-phase OED is defined by considering two rounds of closed-loop testing. The first would perform preliminary classification of policies into low-lifetime or high-lifetime groups. Since quantitative prediction is not required, this prediction algorithm could use minimal cycles (i.e. 5), saving more time. The second phase would proceed as described above. The dynamic early prediction is defined by, as more data is collected, the accuracy of an early prediction algorithm increases. The "batch" setting could be relaxed if the confidence of an early prediction exceeded some threshold; cells could be terminated early if the confidence in the prediction was high, leading to additional time savings. Finally, the multi-cell sampling per policy within the same round is implemented in the current setting, where a maximum of one cell is tested per policy per round. The algorithm could be modified to test promising points repeatedly within the same round.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, one embodiment uses continuous OED, and another embodiment uses OED without any early prediction. All such variations are considered to be within the scope and spirit of the present invention as defined by the following claims and their legal equivalents.

What is claimed:

1. A method of optimizing charging policies for battery cell formation or cycling, the method comprising:
   a) defining a parameter space for a plurality of battery cells being optimized for lifetime;
   b) specifying hyperparameters, wherein said hyperparameters comprise resource hyperparameters, parameter space hyperparameters, and algorithm hyperparameters;
   c) selecting a subset of said charging policies, including repetitions of policies, wherein said charging policies include one or more charging rates;
   d) testing said subset of said charging policies on the plurality of battery cells being optimized, using a battery cycling instrument, until a number of cycles required for accurate lifetime prediction is achieved;
   e) employing an optimal experimental design (OED) algorithm to obtain recommendations for running at least one next test;
   f) iteratively seeking a lifetime-optimized charging policy according to said hyperparameters by running said recommended tests by repeating c)-e) above one or more times using closed-loop lab testing; and
   g) providing the lifetime-optimized charging policy as an output.

2. The method according to claim 1, wherein said parameter space comprises a number of cycling steps, a cycling time, a state-of-charge (SOC) range, and a boundary on a minimum and maximum current, voltage, resistance and temperature, or temperature, per said cycling step.

3. The method according to claim 1, wherein said parameter space comprises a multi-step parameter space to optimize formation cycling or charging rate in a series of defined ranges of said SOC within a specified amount of time, wherein each said step controls a percentage of each said SOC range, wherein each said SOC range is independent from the other said SOC ranges, wherein a final said SOC range is a summation of all said SOC ranges prior to said final SOC range.

4. The method according to claim 1, wherein said resource hyperparameters comprise a number of available testing channels, and a number of batches.

5. The method according to claim 1, wherein said parameter space hyperparameters comprise a mean and standard deviation of a lifetime across all said policies, and a standard deviation of a single said policy tested multiple times.

6. The method according to claim 1, wherein said algorithm hyperparameters comprise a degree of similarity between neighboring said policies in said parameter space, an exploration constant to control a balance of exploration versus exploitation, and a decay constant of said exploitation constant per round.

7. The method according to claim 1, wherein a preliminary set of cells are configured to generate data to develop an early prediction model, quantify a mean, a standard deviation, and a range of lifetime over said parameter space, and quantify an intrinsic cell-to-cell variation for nominally identical cells cycled with nominally identical cycling conditions.

8. The method according to claim 7 wherein the early prediction model is a dynamic early prediction model, wherein said dynamic early prediction model comprises decreasing a size of said preliminary set of cells as more data is collected if a prediction confidence increases.

9. A multi-phase optimal experimental design (OED) method, wherein said multi-phase OED method comprises a first round of closed-loop testing and a second round of closed-loop testing, wherein said first round of closed-loop testing comprises performing a preliminary classification of policies into a low-lifetime policy group or a high-lifetime policy group, wherein quantitative prediction is not required, and wherein said second round of closed-loop testing comprises the method of claim 1.

10. The method according to claim 1 further comprising multi-cell sampling per charging policy within a test policy round, wherein said multi-cell sampling is directed to one or more cells of interest within said test policy round.

11. The method of claim 1, wherein the charging policies relate to fast charging.

12. The method of claim 1, wherein the charging policies relate to battery formation.

13. The method of claim 1, further comprising validating the lifetime-optimized charging policy by testing multiple batteries to failure according to the lifetime-optimized charging policy.

* * * * *